Patented Jan. 20, 1942

2,270,812

UNITED STATES PATENT OFFICE 2,270,812

CRACKING OIL WITH CATALYSTS

Ralph M. Melaven, Highland, Ind., and Rodney V. Shankland, Chicago, Ill., assignors to Standard Oil Company, Chicago, Ill., a corporation of Indiana No Drawing. Application December 31, 1938, Serial No. 248,870

4 Claims. (Cl. 196—52)

This invention relates to the use of a cracking catalyst for the conversion of hydrocarbon oils and particularly to the conversion of heavy hydrocarbon oils such as gas oils, petroleum residuums, hydrocarbon waxes, etc. into lower boiling hydrocarbons, particularly gasoline. The invention relates more particularly to using catalysts for the conversion of heavy hydrocarbon oils at high temperatures. One of the objects of the invention is to provide a catalyst which will convert a larger amount of the oil into gasoline before it becomes necessary to regenerate it. Another object of the invention is to provide a catalyst which may be repeatedly regenerated by treatment with an oxygen containing gas for removal of carbonaceous matter without significant loss of catalyst activity. Still another object of the invention is to provide a catalyst of great physical strength which may be employed in granular form without serious disintegration. Other objects will become apparent from the following description.

The catalyst which we employ is prepared in the following manner: A silica gel, so-called, is prepared by adding a solution of soluble silicate, for example, sodium silicate, to an excess of strong mineral acid, such as hydrochloric acid or sulfuric acid. We prefer to use sodium silicate solution containing about 15% to 20% of $Na_2(SiO_3)_x$. In this formula $x$ is unity or greater. The acid employed in making the gel may suitably be about 15% to 25% $H_2SO_4$ and an excess of 10% to 50% may suitably be employed. Other strong acids may be used, such as HCl, $HNO_3$, etc. We have sometimes reversed this procedure, however, and added the acid to the silicate solution which causes immediate precipitation. This method gives a very active catalyst but one of low mechanical strength.

After adding the silicate solution to the acid, and mixing, it is allowed to stand and soon the silicic acid solution coagulates and forms a jelly. This is broken up by agitation and washed in running water until substantially all the acid and soluble salts are removed. Considerable time is required to permit all the salts to diffuse from the pieces of jelly and the washing operation is facilitated by employing hot water or by digestion and boiling. The gel is then separated from the water and dried. It now resembles an irregular sand and at this stage it is crushed and screened to remove particles which are too fine for ultimate use. The gel so prepared is characterized by possessing a submicroscopic pore structure which provides an enormous amount of "pore surface" accessible only to those materials which can freely penetrate the pores and gain access to the interior of the grains. The diameter of the pores has been determined, by different methods, to be about 5 millimicrons. If desired, the gel may be washed only partially at first, then partly dried and finally washed until the water gives no further test for acid ion. Also, the gel may be further washed with distilled water after final drying.

The next step in the preparation of the catalyst is to subject the gel to the action of a soluble salt of thorium under conditions such that a layer of insoluble thorium compound is deposited on the interior pore surface of the gel. Heretofore, attempts have been made to deposit metal compounds on silica gel but these attempts have usually not succeeded in accomplishing more than depositing the metal compound on the external surface of the silica gel grains. Because of the extremely small dimensions of the pores, these are apparently plugged by precipitates and great care must be exercised to prevent the formation of a heavy precipitate. This we avoid by maintaining the gel in a slightly acid condition and the presence of basic precipitating reagents is scrupulously avoided.

As an example of the method of making the catalyst, silica gel was prepared by diluting commercial water glass containing about 30% of sodium silicate with an equal volume of distilled water. Hydrochloric acid of 5 N. concentration was then added, with stirring, until about 20% of excess acid was present above that required to neutralize the water glass. The precipitated silica was then washed with hot distilled water until the washings tested free of chloride. About 100 grams of moist precipitate was digested on a steam bath for two hours with about 3 liters of 0.1 molar thorium nitrate solution. This treatment causes a hydrolysis of the thorium nitrate accompanied by the deposition of a thorium compound on the surface of the silica which we believe to be an adsorbed layer not more than one molecule thick.

The treated silica was washed three times by decantation with distilled water followed by two washings with hot water and two washings with cold water on a suction funnel using about 300 ml. of water for each wash. The washed material was finally dried at 210 to 220° F. in a steam heated drying oven after which it was ready for use as a catalyst for promoting cracking of gas oil. It is estimated that the amount of thorium in the dried catalyst was about 0.5 wt. %.

When activating the gel with thorium salt, we prefer to maintain the solution slightly acid corresponding to a hydrogen ion concentration of about 1–4 pH. The hydrogen ion concentration will usually increase during the activation treatment, for example, the pH may be 2.5 at the start and 1 to 1.5 at the end of the treatment.

We prefer to employ this catalyst for the cracking of hydrocarbon oils at temperatures of about 700 to 1050° F., employing contact times of between about 1 second to 5 minutes, preferably contact times within the range of 5 seconds to 60 seconds. Contact time referred to is the time required for one volume of oil vapor at the condition of experiment to pass one volume of catalyst. We prefer to employ the catalyst at relatively low pressures, for example, atmospheric to 50 lbs. per square inch gage. However, somewhat higher pressures, e. g., 100 to 200 lbs. per square inch may be used.

As an example of the cracking of a typical gas oil with thorium-silica catalyst, the following results were obtained with a Mid-Continent gas oil of 35° A. P. I. gravity:

|  | Thorium-silica catalyst |
|---|---|
| Weight of catalyst employed | 35.6 kg. |
| Volume of catalyst space | 117 liters. |
| Cracking temperature | 925° F. |
| Pressure | Atmospheric. |
| Feed rate | 142 liters/hr. |
| Space velocity Vol. oil/vol. catalyst/hr | 1.21. |
| Space velocity Vol. oil/ton catalyst/hr | 22.8 bbls. (42 gal.). |
| Time of contact (calculated) | 8.5 seconds. |
| Length of run | 6.03 hours. |
| Weight recovery | 95 per cent of oil charged. |
| Once through yields: |  |
| Dry gas | 2.3 per cent (weight). |
| Gasoline | 16.5 per cent (volume). |
| Cycle stock | 76.4 per cent (volume). |
| Cracking rate | 23.1 liters of gasoline/hr. |
| Volume of gas per gal. of gasoline | 16.2 cu. ft. |
| Specific gravity of gas | .80. |
| Gasoline: |  |
| End point | 400° F. |
| Gravity | 59.9° A. P. I. |
| Knock rating (from blends) | 83.0 C. F. R. M. |
| Unsaturation | 84.5 per cent. |
| Refractive index $N^{20}_D$ | 1.4185. |
| Cycle gas oil: |  |
| 50% point | 560° F. |
| End point | 704° F. |
| Gravity | 35.4° A. P. I. |
| Unsaturation | 18.5 per cent. |
| Aniline point | 172° F. |
| Refractive index $N^{20}_D$ | 1.4726. |

The "Space Velocity" is based on the volume of liquid oil charged, not the volume of vapor.

An inspection of these data will show that the thorium-silica catalyst produces a gasoline of exceptionally high knock rating at the same time producing a cycle gas oil of substantially the same gravity as the charging stock previously employed. By increasing the time of contact we may increase the extent of cracking to produce higher gasoline yields in a single pass. For example, yields of 25% to 40% and even 50% of gasoline may be produced in a single passage through the catalyst, thus reducing the amount of cycle gas oil.

Another characteristic of thorium catalyst is illustrated by the following series of tests in which the same catalyst was used repeatedly. The charging stock was 35° Mid-Continent gas oil in each case and the cracking conditions employed were atmospheric pressure and 925° F. with a run period of 6 hours:

|  | Run No. |  |  |  |
|---|---|---|---|---|
|  | 1 | 2 | 3 | 4 |
| Catalyst | Fresh thorium on SiO₂ | Regenerated from 1 | Regenerated from 2 | Regenerated from 3 |
| Space velocity | .82 | .81 | .84 | .97 |
| Gasoline (vol. percent) | 19.9 | 24.1 | 27.8 | 32.3 |
| Gas loss (weight percent) | 2.47 | 2.73 | 3.41 | 3.59 |
| Knock rating, C. F. R. M. | 70.5 | 77.5 | 78.0 | 78.0 |

The results of these experiments show that there is a distinct induction period during which thorium activated catalyst increases in its activity as shown by the increase in gasoline yield. Furthermore, the gasoline obtained with the regenerated catalyst had the higher knock rating. Regeneration in these experiments was performed by passing a stream of hot oxidizing gas over the catalyst in the manner herein described. The catalyst employed in these experiments was made by dissolving 174.1 grams of thorium nitrate, Th(NO₃)₄,12H₂, in 5 liters of distilled water and adding 850 grams of silica gel. The mixture was digested for two hours on the steam bath and the catalyst was then separated and dried in the steam oven.

The explanation of the enhanced effectiveness of the catalyst is not easily determined. We believe, however, that when the silica gel is treated with the thorium salt solution, there occurs a simultaneous adsorption and hydrolysis causing the deposition of a thorium compound on the surface of the silica throughout its entire pore structure. This compound is probably an oxygen compound of thorium such as thorium hydroxide or more probably the thorium unites to form a complex compound with the SiO₂ molecules and hydrated SiO₂ molecules on the surface of the gel and within the pores of the grains thereof. It is believed that the molecules of SiO₂ at the surface present unsatisfied valences which form a chemical union with the thorium and its compounds so that the gel treated with thorium salt solution is substantially identical in physical structure with the untreated silica gel excepting that the entire surface, including the immense interior pore surface, is coated with not more than a monomolecular layer of thorium compound. Furthermore, we believe that the electronic structure of the thorium compound on the surface is disturbed by the unbalanced electronic structure of the SiO₂, previously referred to as unsatisfied valence, and that in some way the peculiarly high activity of these catalysts is related to their unbalanced electronic structure, or to the molecular orientation of the thorium compound.

As evidence of the hydrolysis of the thorium salt on the surface of the gel, we find that the solution develops a definite acidity which can only be accounted for by the following hydrolytic reaction:

$$Th(NO_3)_2 + 2H_2O + xSiO_2 = Th(OH)_2 \cdot (SiO_2)_x + 2HNO_3$$

We choose to call this reaction an "adsorbolytic" reaction, indicating that the hydrolysis or splitting of the thorium salt is brought about by the adsorption phenomenon. Simultaneously, with the formation of acid in the solution, there is deposited within the silica a measurable amount of thorium compound which we have shown by analysis to vary between about 0.1 to 2% of thorium, depending partly on the concentration of thorium salt solution employed, the hydrogen ion concentration in the solution, and the method of treatment. One typical analysis indicated the presence of 0.29% of thorium in the catalyst.

Although we prefer to use a thorium salt solution of about 0.1 molar concentration, this may be varied over a considerable range without greatly affecting the amount of thorium deposited within the gel. Thus, we may use concentrations from about 0.02 M. to 1.5 M., if desired. We may increase the amount of thorium hydrolyzed by various methods. For example, we may add a buffer salt to the solution, such as thorium acetate for the purpose of regulating the pH value of the solution, care being taken to avoid pH values which might result in the precipitation of insoluble thorium compounds by double decomposition. We may also repeat the treatment of the gel with thorium solution of the same or different concentrations, or we may perform the treatment in a flowing stream. The thorium salt solution may be made to flow through a series of beds of the gel in rotation so that the most nearly spent solution serves to contact the fresh gel, thus adsorbing the greater amount of the thorium from the solution.

In the previous description of preparing the catalyst, the freshly prepared gel was dried after washing and before treating with the thorium solution. However, it is sometimes desirable to omit this drying step. The freshly made gel which has been thoroughly washed may be immediately treated with the thorium solution and then dried. In this case, however, a longer time is required for diffusion of the solution into the larger pieces of the jelly or precipitate.

As indicated above, the catalyst may be regenerated after it has become fouled with carbonaceous deposits in the cracking operation. Regeneration is most conveniently accomplished by passing a stream of air and inert gas, for example, steam, through the catalyst bed, care being taken to control the oxygen concentration of the regenerating gas so that the combustion temperature is kept below about 1200° F. and preferably below about 1100° F. Excessive heating above these temperatures causes catalyst deterioration. After regeneration, the cracking may be continued. The duration of cracking between regeneration periods may be about 5 hours but this depends largely on the nature of the stock being cracked. If the stock cracked is a residual oil containing asphaltic matter, the duration of cracking is considerably less before catalyst activity is seriously reduced. Thus, with a typical Mid-Continent residual oil of about 22° A. P. I. gravity, the catalyst may be used for a period of about 30 minutes to 2 hours between regenerations. When using gas oil, we have found that in a typical operation the catalyst activity has decreased about 25% to 50% in a period of 6 hours. The extent or depth of cracking per pass depends partly on the freshness of the catalyst and on the temperature. If desired, the process may be conducted to produce from gas oil about 45% to 55% of gasoline in a single pass and the uncracked products heavier than gasoline may be either recycled in the operation or cracked in a secondary cracking operation. Alternatively, the extent of cracking may be maintained about 20 to 30% and the uncracked heavy products may be recycled until completely cracked, the only products being gasoline and gas. Carbonaceous matter produced in the operation, is deposited on the catalyst and removed in regeneration.

If desired, we may employ the catalyst in a moving bed apparatus in which a portion of the spent catalyst is continuously withdrawn and regenerated externally, fresh and/or regenerated catalyst being supplied continuously to the apparatus. We may also employ the catalyst in finely divided form. For example, the catalyst may be finely divided by grinding and supplied as a slurry in oil to the cracking chamber or coil or introduced as a powder into the vapor stream. In this type of operation, the spent catalyst is settled or filtered from the products and separately regenerated.

Although we have given specific examples of methods of preparing the catalyst and have described its use in certain cracking operations, we intend that our invention be limited only by the following claims.

We claim:

1. The process of converting heavy hydrocarbon oils into gasoline, comprising vaporizing said oils and subjecting the vapors at a temperature between about 700 and 1050° F. to the action of a catalyst consisting essentially of silica gel treated with a thorium compound in an acid solution and thereafter washed and dried.

2. The method of preparing an active cracking catalyst for converting hydrocarbon oils into gasoline of high knock rating which comprises subjecting silica gel to the action of a soluble thorium compound in an acid solution, separating the treated silica gel from the solution and drying it, contacting the treated silica gel with vapors of hydrocarbon oil at an elevated temperature until the cracking activity of the treated silica gel is substantially impaired by the deposition of carbonaceous matter thereon, restoring the activity of the treated silica gel by burning off said carbonaceous matter with an oxidizing gas and repeating the contacting operation and the regeneration operation until the cracking activity of said treated silica gel is substantially increased.

3. The process of converting heavy hydrocarbon oils into gasoline comprising vaporizing said oils and subjecting the vapors thereof at a temperature between about 700 and 1050° F. to the action of a solid, porous, contact catalyst consisting essentially of silica gel, the surface of which is coated with a layer of thoria, cooling the vapors and recovering gasoline from the products.

4. The process of converting heavy hydrocarbon oils into gasoline, comprising vaporizing said oils and subjecting the vapors thereof at a temperature between about 700 and 1050° F. to the action of a catalyst comprising silica gel and thoria deposited thereon by adsorbolytic reaction in an acid solution.

RALPH M. MELAVEN.
RODNEY V. SHANKLAND.